Patented Feb. 6, 1945

2,368,949

UNITED STATES PATENT OFFICE 2,368,949

SAPONIFICATION PRODUCTS OF POLYVINYL ESTERS

Joseph Edward Smith, Wilmington, Del., assignor to E. I. du Pont de Nemours & Company, Wilmington, Del., a corporation of Delaware No Drawing. Application January 7, 1943, Serial No. 471,577

7 Claims. (Cl. 260—90)

This invention relates to the preparation of saponification products of polyvinyl esters and more particularly to a process for preparing partially or completely saponified polyvinyl acetates which may be employed as the emulsifying and dispersing agents in the preparation of stable aqueous emulsions and dispersions.

Partially and completely saponified polyvinyl esters and more particularly partially saponified polyvinyl acetates are known to be excellent emulsifying and dispersing agents for resins, waxes, oils and the like in aqueous medium. However, in many cases it has been found that these partially or completely saponified polyvinyl esters contain as impurities materials which render them unsuitable for this use and although extended studies have been made it has been impossible to ascertain the nature of the impurities present which render them of no value for this purpose.

While saponification products of polyvinyl esters which are suitable for use as emulsifying and dispersing agents may be prepared by starting with a vinyl ester monomer of high purity and by careful control in the polymerization and saponification steps, it has been found that in preparing the partially or completely saponified polyvinyl esters commercially on a large scale the product obtained is often so badly contaminated with impurities of unknown constitution that it is of no use whatsoever for the preparation of highly stable emulsions and dispersions. In many cases the contaminating material cannot be detected prior to its use for the product dissolves in a clear solution in water, indicating that the impurities are either soluble, colloidally dispersed or present in such minute quantities that they cannot be detected by ordinary analytical methods.

It is therefore an object of this invention to prepare water soluble saponification products of polyvinyl esters, and more particularly of polyvinyl acetate, that are of uniform quality with regard to their properties which render them useful for the preparation of highly stable aqueous emulsions and dispersions. It is a further object of the invention to provide a simple, economical and commercially feasible process for extraction from the water soluble saponification products of polyvinyl acetate those impurities which have a destabilizing effect on emulsions and dispersions prepared therefrom.

I have found that by treating an aqueous solution of a partially or completely saponified polyvinyl acetate with activated charcoal either alone or with a diatomaceous earth, followed by filtration, a solution of the partially or completely saponified polyvinyl acetate is produced that has excellent emulsifying and dispersing properties for organic resins, waxes and oils, even though the material before treatment was useless for this purpose. The use of a diatomaceous earth along with the activated charcoal assists in obtaining rapid filtration and therefore is of value in decreasing the time required for the treatment. The destabilizing impurities of unknown constitution appear to be selectively adsorbed by the activated charcoal resulting in a new and valuable product for producing highly stable emulsions and dispersions. Suitable activated charcoals are known in the trade as "Nuchar" and "Darco." A suitable diatomaceous earth is known to the trade as "Supercel."

The partially or completely saponified polyvinyl acetate is preferably added to water with efficient agitation to obtain thorough mixing, agitation being continued until a solution is obtained. The mixture may be heated to 60 or 70° C. to increase the rate of solution if desired. After complete solution is obtained the activated charcoal and diatomaceous earth are added and agitation is continued for from 10 to 20 minutes. The solution is then filtered to remove the activated charcoal and diatomaceous earth and the adsorbed impurities. The purification step is preferably carried out with solutions containing less than 10% of the saponified polyvinyl acetate. However, the concentration of saponified polyvinyl acetate in the solution is not critical and is limited only in that the solution must not be too viscous to render filtration impossible. The amount of activated charcoal required naturally will vary, depending on the amount of impurities present in the saponified polyvinyl acetate. It has been found that from 2 to 20% of activated charcoal based on the weight of the saponified polyvinyl acetate is sufficient. The treatment is usually carried out with from 5 to 10% of activated charcoal based on the weight of the saponified polyvinyl acetate. The amount of diatomaceous earth employed with the activated charcoal may be varied widely; an amount equal to that of the activated charcoal gives satisfactory filtering conditions. The time of agitation is of course not critical although it should be long enough to permit the impurities to be adsorbed by the activated charcoal. An agitation time of from 15 to 30 minutes after adding the activated charcoal will usually be found satisfactory in commercial practice. The temperature at which the purification is carried out is not critical, except that it should be maintained within the range in which the partially saponified polyvinyl acetate is soluble in water. Temperatures of from 60 to 70° C. are preferred in the commercial practice of this invention. The filtration is perferably carried out under pressure, either by means of filter presses or with a suction filter.

The following examples are given to illustrate the invention. The parts used are by weight.

Example 1

Three parts of a commercially prepared water soluble partially saponified polyvinyl acetate containing adsorbable impurities which act as destabilizing agents in the preparation of emulsions and dispersions and which has an average saponification number of about 80 and produces an aqueous solution with a viscosity of 20 to 25 c. p. at 20° C. at 4% concentration, are mixed with 67 parts of water at room temperature and agitated efficiently. The mixture is heated to about 70° C. and agitation continued until a solution is obtained. 0.3 part of activated charcoal is added to the solution and agitation is continued for 15 minutes. The solution is then filtered with the aid of pressure or suction to remove the activated charcoal. This product is found to give highly stable dispersions of finely divided solids in water as more particularly described in U. S. P. 2,318,429 and copending applications 351,083 to 351,088 inclusive, filed August 3, 1940, now U. S. Patents 2,343,089 to 2,343,094, inclusive, for example.

Thirty parts of n-butyl methacrylate monomer containing 0.3 part of benzoyl peroxide are mixed with the purified partially saponified polyvinyl acetate solution, using a high-speed mixer. The emulsion obtained is homogenized in a colloid mill and then aged by heating for 4 hours at 70° C. without agitation. The resin dispersion obtained is filtered through several layers of cheesecloth to remove any scum formed during the aging process. The dispersion thus obtained is highly stable, and does not break even when stored for several months.

A similar dispersion prepared with the same partially saponified polyvinyl acetate prior to the purification step separated badly during the aging process.

Example 2

Three parts of a commercially prepared water soluble partially saponified polyvinyl acetate containing adsorbable impurities which act as destabilizing agents in the preparation of emulsions and dispersions and which has an average saponification number of about 80 and producing an aqueous solution with a viscosity of 20–25 c. p. at 20° C. at 4% concentration, are mixed with 67 parts of water at room temperature and agitated efficiently. The mixture is heated to about 70° C. and agitation continued until solution is obtained. 0.3 part of activated charcoal and 0.3 part of diatomaceous earth are added to the solution and agitation continued for from 15 to 20 minutes. The solution is filtered with suction or pressure to remove the activated charcoal and diatomaceous earth.

Thirty parts of methyl methacrylate monomer containing 0.3 part of benzoyl peroxide are mixed with the purified partially saponified polyvinyl acetate solution obtained above, using a high-speed mixer. The emulsion obtained is homogenized in a colloid mill and then aged (polymerized) by heating for from 4 to 16 hours at 70° C. without agitation. The resin dispersion obtained is filtered through several layers of cheesecloth to remove any scum formed during the aging process. The dispersion thus obtained is stable and may be stored for extended periods of time.

A similar dispersion prepared with the same partially saponified polyvinyl acetate without the purification step separated badly during the aging process.

Example 3

When a solution of 1.5 parts of refined paraffin wax and 0.3 part of benzoyl peroxide in 28.2 parts of n-butyl methacrylate monomer is substituted for the 30 parts of n-butyl methacrylate monomer in Example 1, a resin dispersion is obtained which is highly stable. A resin-wax dispersion prepared in a similar manner with the partially saponified polyvinyl acetate prior to purification separated during the aging step.

Example 4

2.5 parts of a commercially prepared water soluble partially saponified polyvinyl acetate containing adsorbable impurities which act as destabilizing agents in the preparation of emulsions and dispersions and which has an average saponification number of about 130 and produces an aqueous solution with a viscosity of 20–25 c. p. at 20° C. at 4% concentration, is mixed with 67.5 parts of water at room temperature. The mixture is heated to 70° C. while agitating efficiently and agitation is continued until a solution is obtained. 0.25 part of activated charcoal and 0.25 part of diatomaceous earth are added to the solution and agitation continued for 15 minutes. The solution is filtered to remove the activated charcoal and the diatomaceous earth together with the adsorbed impurities.

Twenty five parts of refined paraffin wax are melted and heated to 95° C. The molten wax is added to the solution of partially saponified polyvinyl acetate above prepared at 70° C., while mixing with a high-speed stirrer. Five parts of a 22% basic aluminum formate solution are added while continuing the agitation. The emulsion obtained is homogenized by means of a colloid mill and then cooled to room temperature. The aqueous dispersion obtained after cooling is filtered through several layers of cheesecloth to remove any foam and gross particles. The filtered dispersion is highly stable and remains in excellent condition during storage for several weeks.

A similar dispersion prepared with unpurified partially saponified polyvinyl acetate creamed badly with the formation of a heavy non-dispersible wax layer on standing 24 hours.

Example 5

Three parts of a commercially prepared water soluble partially saponified polyvinyl acetate containing adsorbable impurities which act as destabilizing agents in the preparation of emulsions and dispersions and which has an average saponification number of about 130 and produces an aqueous solution with a viscosity of 20–25 c. p. at 20° C. at a 4% concentration is mixed with 67 parts of water at room temperature. The mixture is heated to 70° C. while agitating vigorously and agitation is continued until a solution is obtained. 0.3 part of activated charcoal and 0.3 part of diatomaceous earth are added to the solution and agitation continued for about 30 minutes. The solution was then filtered to remove the activated charcoal and diatomaceous earth with the adsorbed impurities and cooled to about 25 to 30° C.

Fifteen parts of n-butyl methacrylate polymer dissolved in 15 parts of toluene are added to the solution of purified partially saponified polyvinyl acetate as above prepared, while agitating vigorously. The agitation is continued until a homogeneous emulsion is obtained. The emulsion is further homogenized in a colloid mill. The resulting emulsion is filtered through cheesecloth to remove any gross particles which may be present. The filtered dispersion is freely fluid and has good stability and may be stored for extended periods of time, while a similar product prepared with the unpurified polyvinyl alcohol creams during storage.

This invention is applicable broadly to the treatment of water soluble derivatives of polyvinyl alcohol containing hydroxyl groups and to the treatment of partially or completely saponified water soluble polyvinyl esters, where these materials are to be used as stabilizing agents for emulsions, dispersions and suspensions in water. This invention is particularly applicable to the preparation of substantive or non-substantive stable emulsions or dispersions of organic resins, waxes and oils, such as those described in U. S. Patents 2,277,788 and 2,318,429 and in co-pending applications Ser. Nos. 351,083 to 351,088 inclusive, or of other types such as alkyd resins and other resins formed by the polymerization of mono-olefins and di-olefins, for example, vinyl halides, vinylidine halides, isobutylene and ethylene, etc., or in the preparation of emulsions or dispersions of mixed polymers, copolymers and interpolymers of the types above mentioned.

Because of the fact that the unsuitability of the saponification product of polyvinyl acetate to produce stable emulsions or dispersions often cannot be ascertained until the emulsion or dispersion prepared with it has been stored for a long period of time, while in other cases it becomes apparent immediately, one can never be sure of the stability of the product during commercial distribution and storage, when an unpurified water soluble polyvinyl alcohol is employed.

The present invention is therefore of importance because it insures the manufacturer of a product of uniformly high quality, and permits the use of products that have been found to be entirely unsuitable for the preparation of stable dispersions or emulsions, because of distabilizing impurities.

It will of course be obvious that these purified saponification products of polyvinyl acetate may be employed with equally good or improved results wherever the unpurified material has been employed.

Other well-known filter aids may be substituted for the diatomaceous earth employed in the above examples. While as disclosed in the examples the activated charcoal is preferably suspended in an aqueous solution of the unpurified polyvinyl alcohol product, it will be obvious that the impurities may also be adsorbed by passing the aqueous solution of the polyvinyl alcohol through a layer of activated charcoal, preferably supported on a filter aid.

I claim:

1. In the process for preparing water soluble saponification products of polyvinyl esters which are free from impurities that break emulsions or dispersions prepared with said saponification products, the step which comprises treating an aqueous solution of said saponification product of the polyvinyl esters with activated charcoal.

2. In the process for preparing water soluble saponification products of polyvinyl esters which are free from impurities that break emulsions or dispersions prepared with said saponification products, the steps which comprise dispersing in an aqueous solution of said saponification product of the polyvinyl ester activated charcoal and a filter aid, and filtering to free the aqueous solution from the solid materials.

3. In the process for preparing water soluble saponification products of polyvinyl esters which are free from impurities that break emulsions or dispersions prepared with said saponification products, the steps which comprise dispersing in an aqueous solution of said saponification product of the polyvinyl ester activated charcoal and diatomaceous earth, and filtering to free the aqueous solution from the solid materials.

4. In the process for preparing a water soluble saponification product of polyvinyl acetate which is free from impurities that break emulsions or dispersions prepared therewith, the step which comprises treating an aqueous solution of said saponification product of the polyvinyl acetate with activated charcoal.

5. In the process for preparing a water soluble saponification product of polyvinyl acetate which is free from impurities that break emulsions or dispersions prepared therewith, the steps which comprise dispersing in an aqueous solution of said saponification product activated charcoal and a filter aid, and filtering to free the aqueous solution from the solid materials.

6. In the process for preparing a water soluble saponification product of polyvinyl acetate which is free from impurities that break emulsions or dispersions prepared therewith, the steps which comprise dispersing in an aqueous solution of said saponification product activated charcoal and diatomaceous earth, and filtering to free the aqueous solution from the solid materials.

7. The process of claim 6 wherein the treatment of the saponification product with the charcoal and diatomaceous earth is carried out at temperatures of from 60 to 70° C.

JOSEPH EDWARD SMITH.